UNITED STATES PATENT OFFICE.

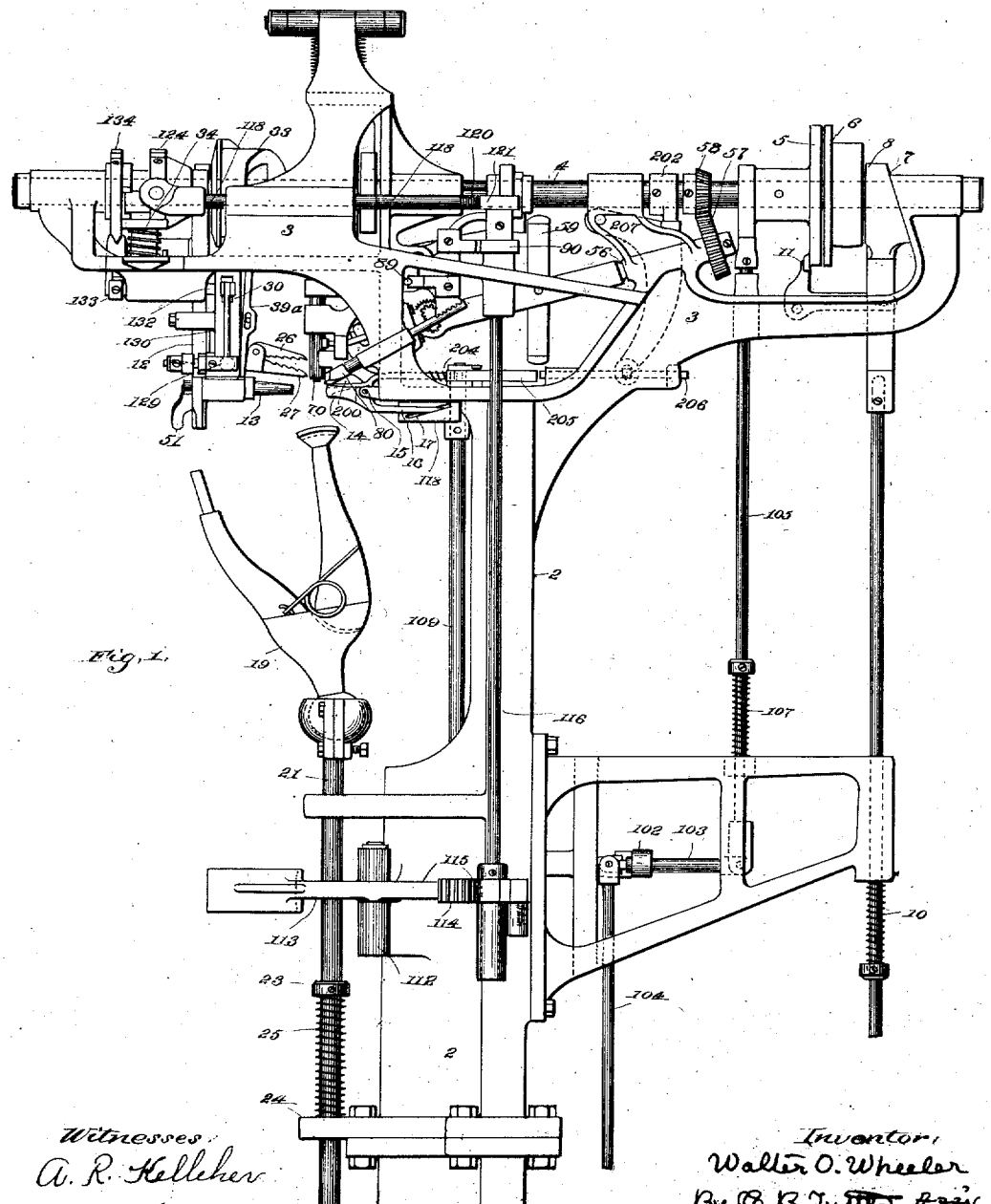

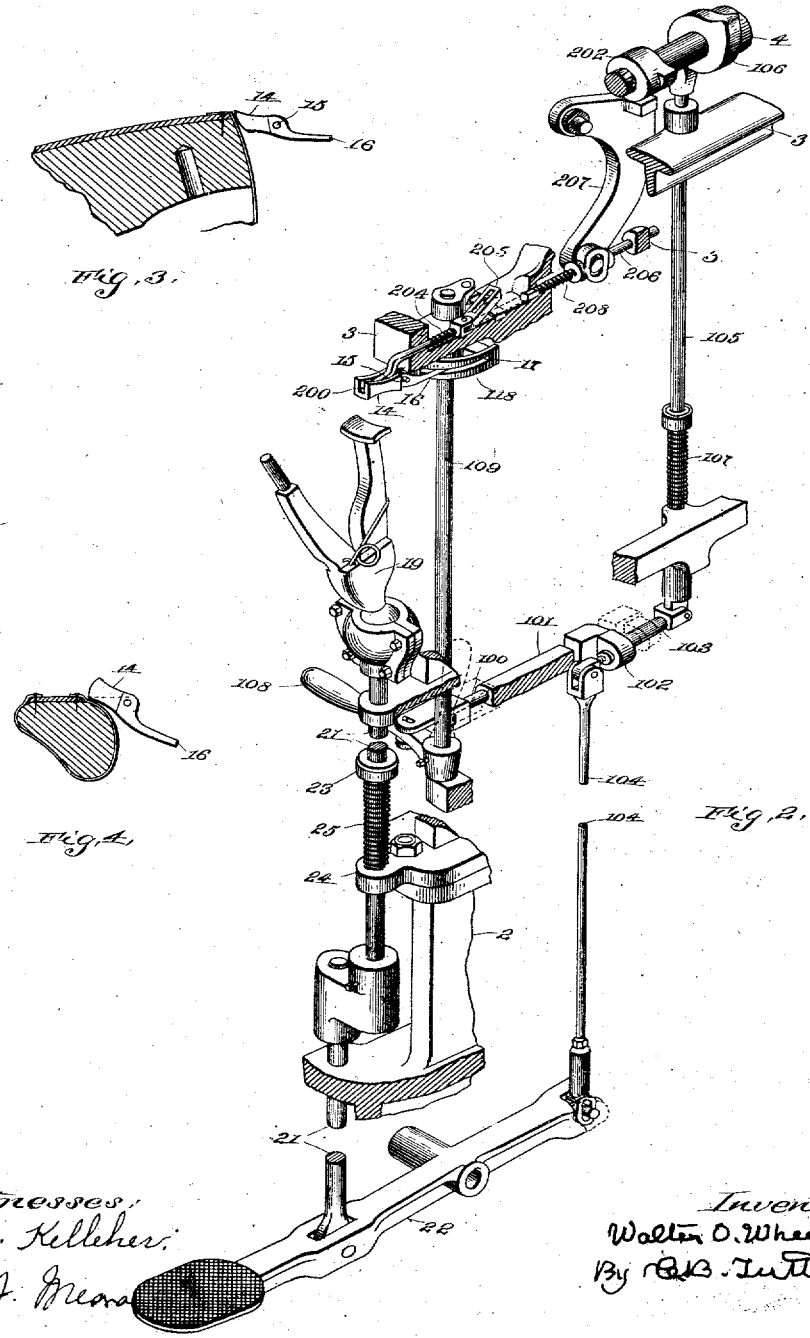

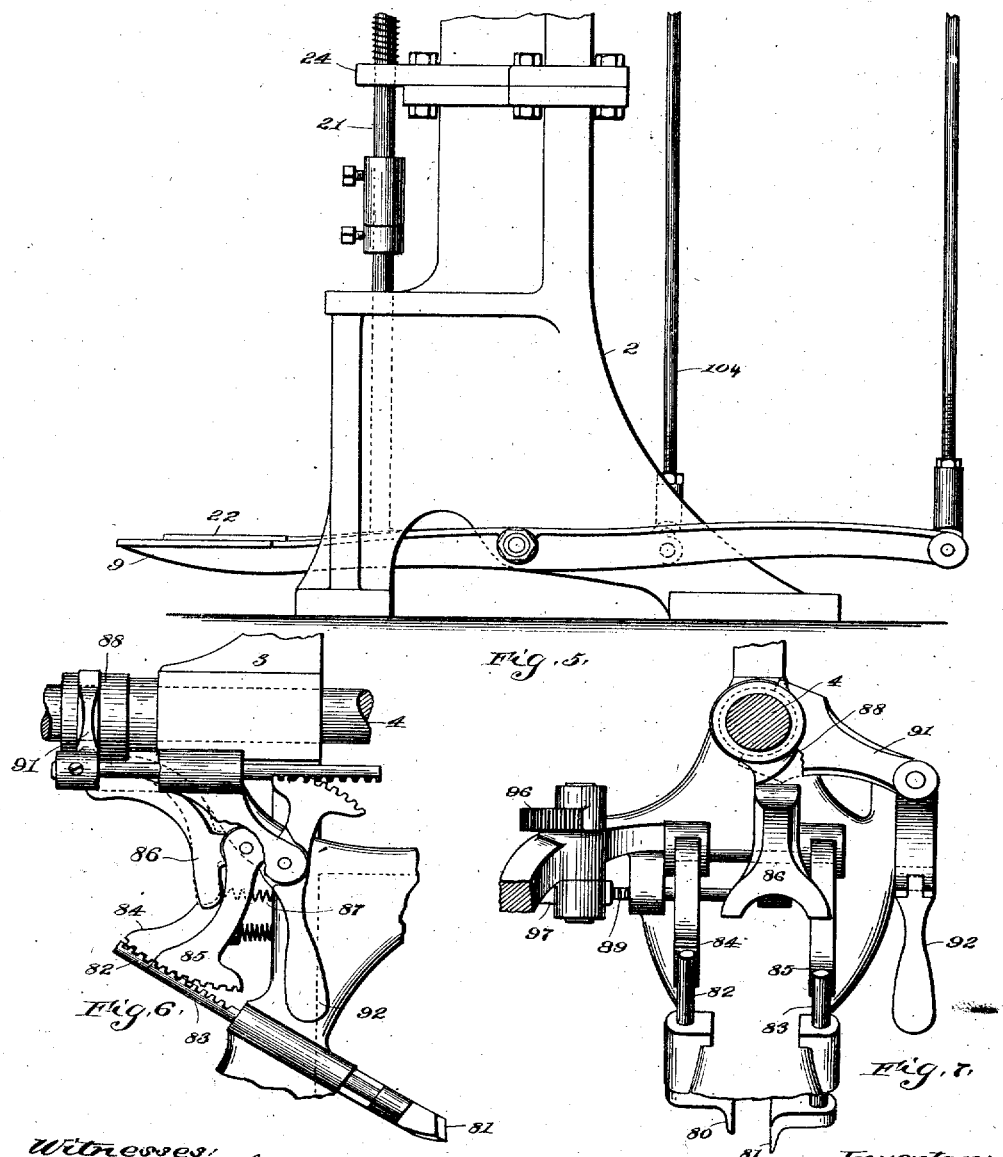

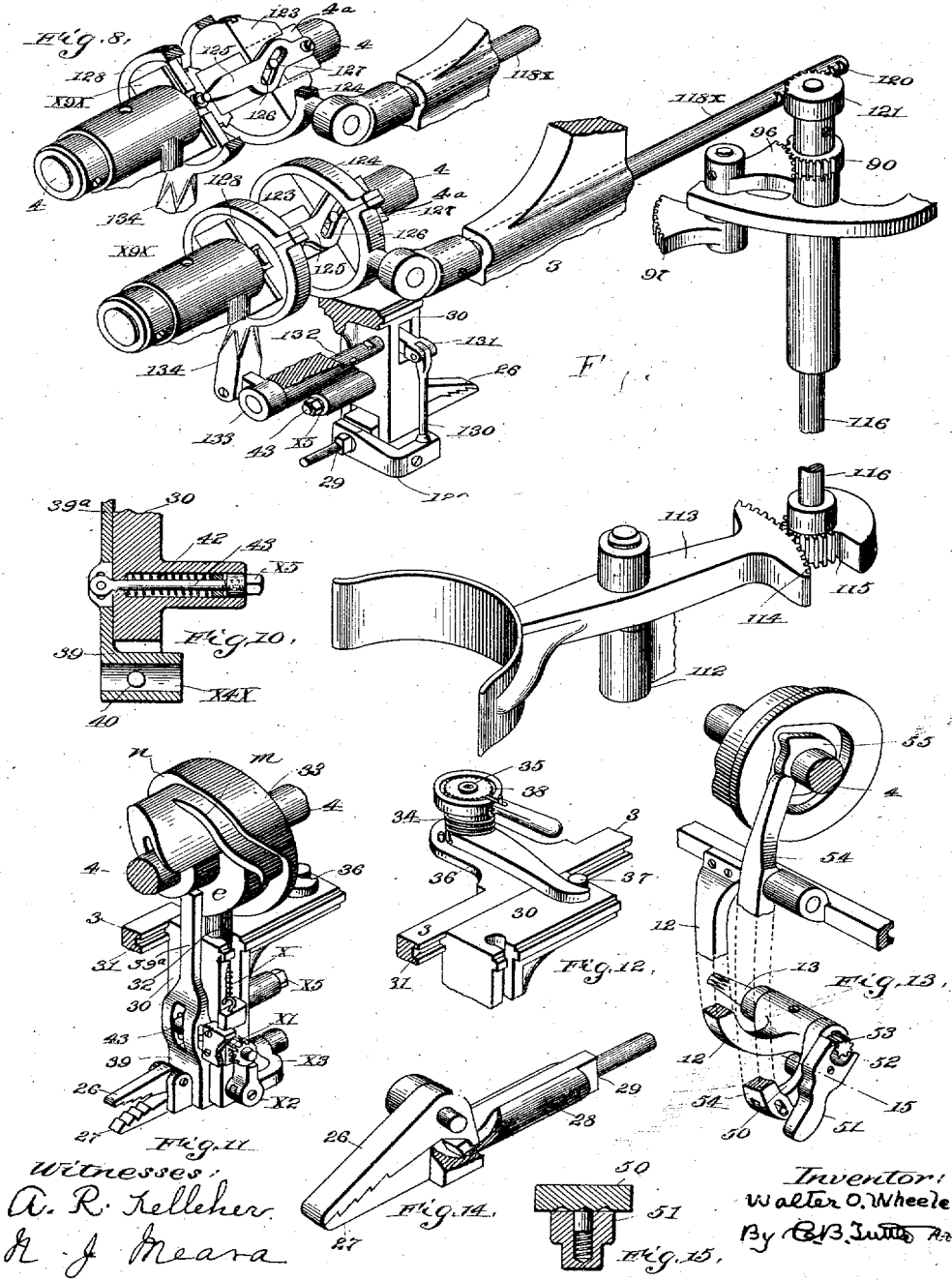

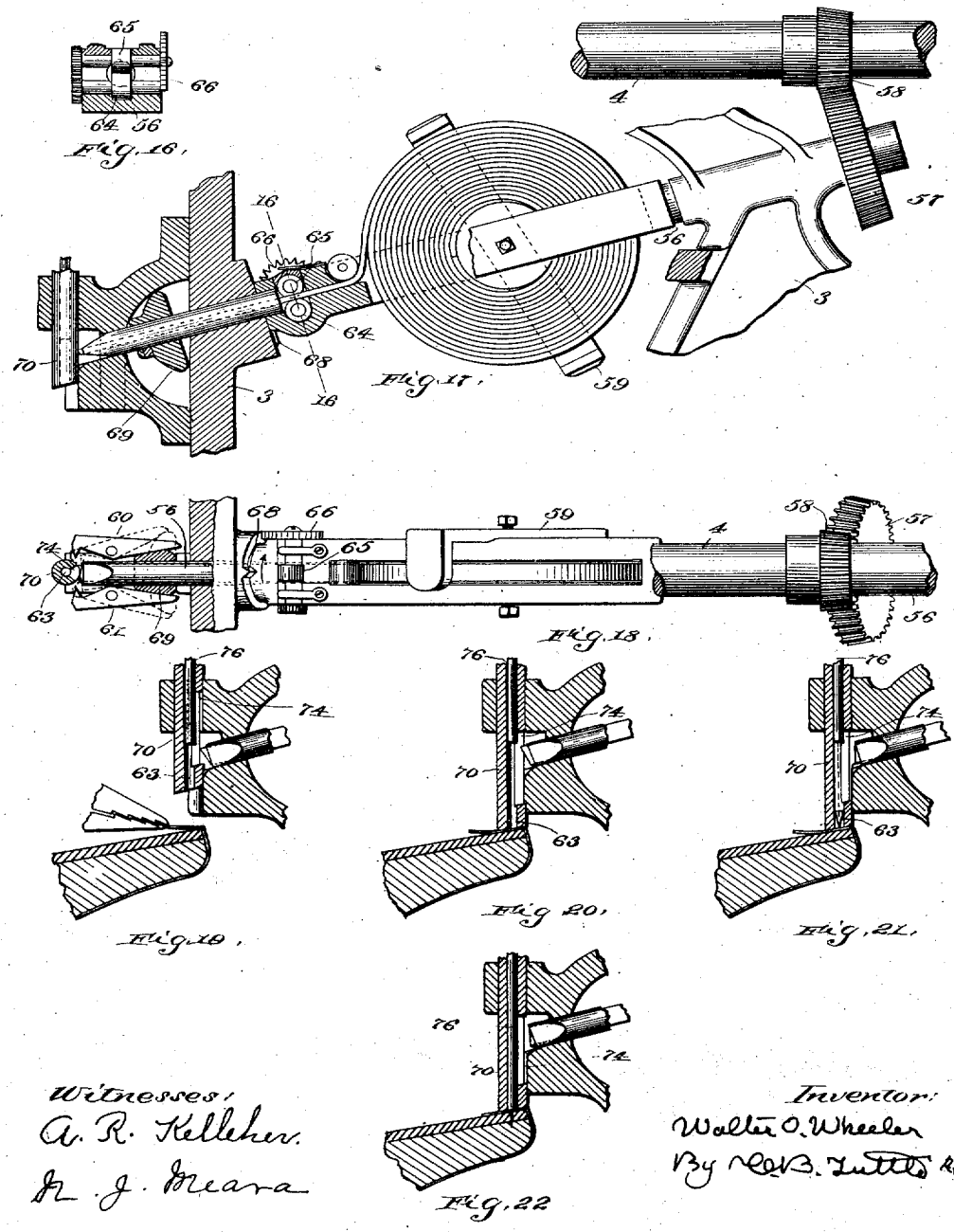

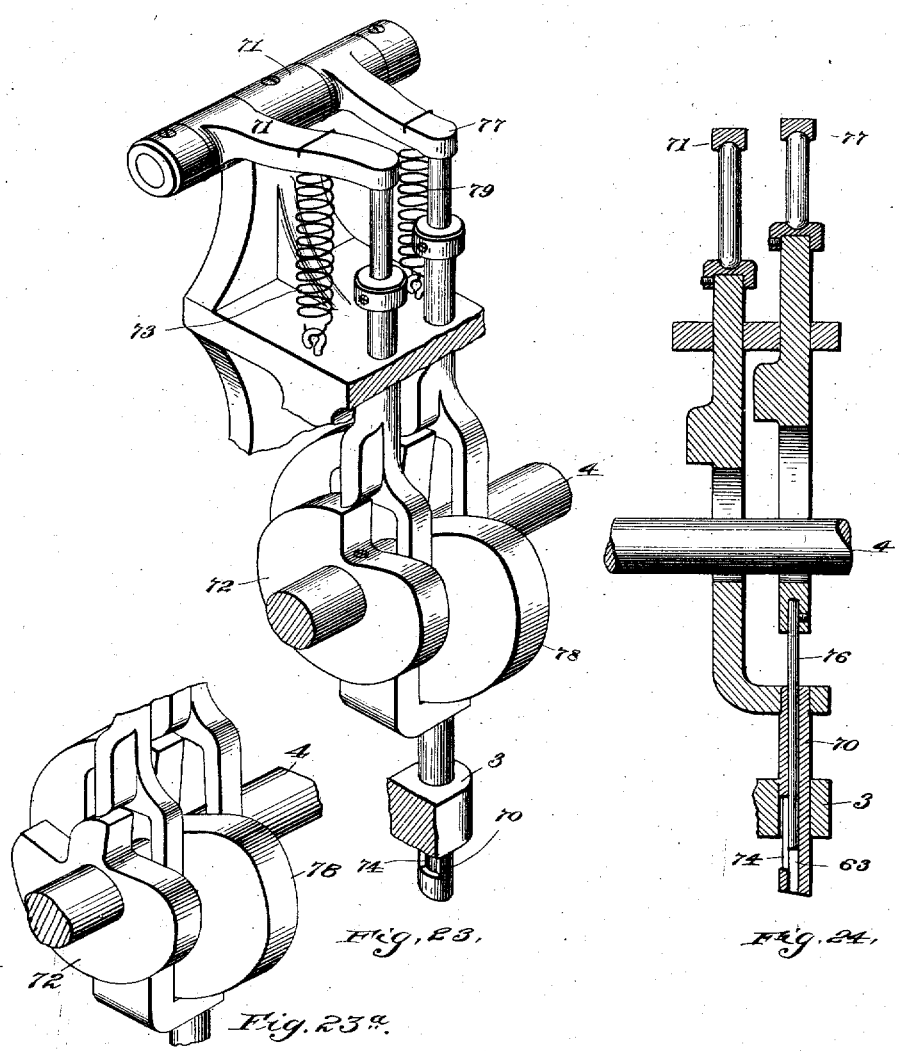

WALTER O. WHEELER, OF WORCESTER, MASSACHUSETTS, ASSIGNOR TO UNITED SHOE MACHINERY COMPANY, OF PATERSON, NEW JERSEY, AND BOSTON, MASSACHUSETTS, A CORPORATION OF NEW JERSEY.

LASTING-MACHINE.

No. 910,251.     Specification of Letters Patent.     Patented Jan. 19, 1909.

Application filed August 7, 1901. Serial No. 71,182.

*To all whom it may concern:*

Be it known that I, WALTER O. WHEELER, a citizen of the United States, residing at Worcester, in the county of Worcester and State of Massachusetts, have invented certain new and useful Improvements in Lasting-Machines, of which the following is a specification.

This invention is, in the present instance, represented as embodied in a lasting machine of the class adapted for working on different parts of the upper successively, the lasting operation being performed as a whole by repeated operations of the machine applied to different parts of the upper at different times. But the invention is not limited to lasting machines of any particular class.

The object of the invention is to improve in numerous respects upon the machines heretofore employed for the purpose of enabling the fitting of the upper to a last to be effected more expeditiously, with less labor, and more smoothly and evenly than by means of prior machines.

The several features of this invention, including certain combinations of parts and details of construction, will appear in connection with the following description of the mechanism in which I have chosen to embody the invention and will then be pointed out in the claims.

It will, of course, be understood that many features of the invention are capable of use in other relations than those herein shown and certain features of this invention may be embodied in other machines than lasting apparatus.

Figure 25:
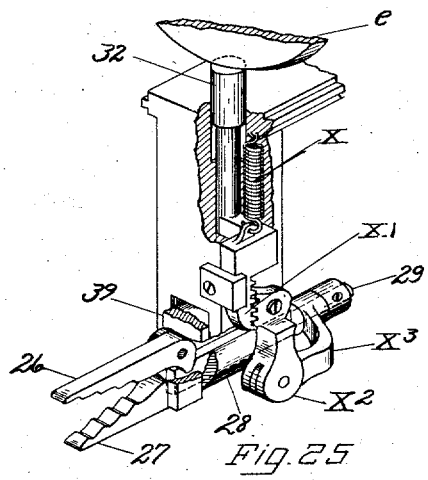
Figure 26:
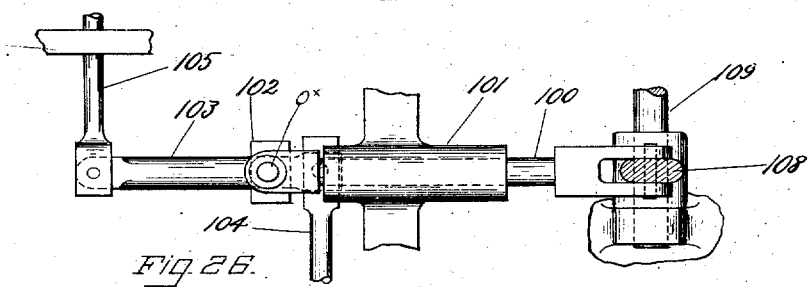
Figure 27:
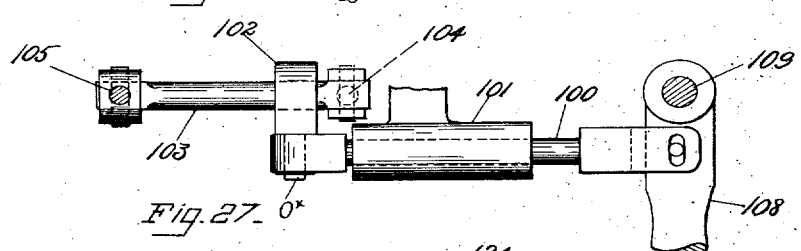
Figure 28:
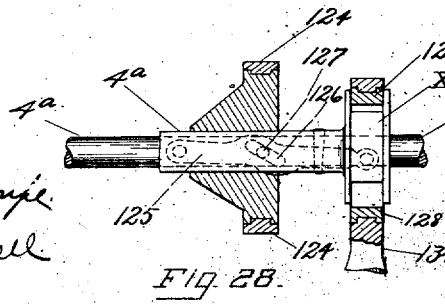

Figure 1 is an elevation showing one side of the machine. Fig. 2 is a perspective view, partly in section, showing operative parts. Fig. 3 is a sectional elevation showing the edge rest in working position for lasting the heel part of the shoe. Fig. 4 is a sectional elevation showing the edge rest in working position for lasting the shank and fore part of the shoe. Fig. 5 is an elevation showing the lower portions of the machine. Fig. 6 is a side elevation showing the mechanism for slitting the upper. Fig. 7 is a rear elevation of the parts shown in Fig. 6. Fig. 8 is a perspective view, partly in section, showing a portion of the mechanism for controlling the pincers turning movements. Fig. 9 is a perspective view, partly in section, showing the parts included in Fig. 8 and additional connecting parts. Fig. 10 is an elevation of a section showing parts connected with the pincers. Fig. 11 is a perspective view showing the pincers mechanism and operating cam connections. Fig. 12 is a perspective view showing parts connected with the pincers carriage. Fig. 13 is a perspective view showing the feeding rest and operating connections therefor. Fig. 14 is a perspective view showing the pincers members. Fig. 15 is an elevation of a section on line 15 of Fig. 13. Fig. 16 is an elevation of a section on line 16 of Fig. 17. Fig. 17 is an elevation, partly in section, showing the mechanism for supplying fasteners. Fig. 18 is a plan of parts shown in Fig. 17. Fig. 19 is a sectional elevation of details showing the relative positions of parts preliminary to the operation of the fastener supplying mechanism. Figs. 20, 21, 22 are also sectional elevations showing parts included in Fig. 19, and represent respectively the parts after the feeding operation and prior to cutting off the fastening; after the fastening is cut off and ready for driving, and after the driving of same. Fig. 23 is a perspective view showing the pounding and fastening driving mechanism. Fig. 23$^a$ shows a modified construction of the pounder operating cam designed to give a plurality of movements to the pounder during one cycle of the machine's operation. Fig. 24 is an elevation of a central vertical section of parts included in Fig. 23. Fig. 25 is a perspective view showing detail of parts connected with Fig. 11. Fig. 26 is a side elevation of the mechanism for rendering operative or inoperative the means for depressing the jack. Fig. 27 is a plan view of the mechanism shown in Fig. 26. Fig. 28 is a sectional view through the front end of the driving shaft 4 and the parts which are illustrated in Fig. 8 as carried by this portion of the shaft.

The machine comprises a column 2, whereon is supported the head 3. In the head 3 is a shaft 4, which shaft 4 carries the disk 5 and supports the disk 6, which rotates loosely on shaft 4, and is movable thereon towards and from disk 5. Disks 5 and 6 are provided with friction appliances whereby, whenever the two are brought together, motion is imparted for revolving the shaft 4. Between the incline 7, on head 3, and disk 6, is a wedge 8, having connection with the treadle member 9, wherethrough the wedge may be moved to force the disk members into contact for starting the machine into operation. Said starting movement is made to take place against the tension of spring 10, which acts to withdraw the wedge for stopping the machine, whenever pressure is removed from the treadle member. This movement also operates to apply the brake 11, on the disk 5, for stopping the machine with promptness.

In the hanger 12 see Fig. 13, is a member 13, which is supported at the proper altitude for the shoe when rested with the bottom pressed upwardly to the under face of member 13, to be in position for the pincers to go forward and grip the upper. Preferably this member has its face corrugated to better engage with and prevent the shoe from slipping. This member is connected with mechanism hereinafter to be described, whereby it is made to revolve at times for feeding the shoe about and presenting different parts of the upper to the pincers' action. For purposes of convenience this member is hereinafter called the feeding rest.

The mechanism herein shown and described for feeding the work is not claimed in this application as it forms the subject matter of a divisional application Serial No. 467930, filed December 17, 1908.

The machine also comprises an edge rest 14, arranged in position for the shoe when held upwardly to the member 13, to be pressed laterally towards the outer end face of the member 14, in which position the said member 14 will bear on the upper at about the point where it breaks or folds over the edge of the inner-sole. In this connection it is important for the edge rest to have a longer bearing on the upper during the process of lasting the heel portion of the shoe than at other times, and to this end the rest member 14 is pivotally connected by a pin 15 with the head 3 to swing vertically, and comprises a rearwardly extending arm 16, which arm is entered into groove 17, suitably formed in the cam 118, whereby, as the cam 118 is moved horizontally, it operates, in one direction of said movement, for lifting, and in the other direction, for depressing the outer or bearing end of the rest 14. In the elevated position this edge rest has a shorter bearing on the shoe (Fig. 4), which is its position during the lasting of the shoe fore part, and it has a longer bearing on the upper when in the depressed position (Fig. 3), which is its position during the lasting of the heel part of the shoe. Cam 118 is supported on the shaft 109 which has connection with the handle 108 to be operated by the workman for shifting the position of the edge rest at will.

The materials to be lasted are prepared for the lasting operation by fitting the upper, its lining, the counter, etc., upon the last, with the inner-sole in position upon the bottom thereof, all in the usual way. As such it is technically termed the "shoe." In the machine represented the shoe is supported by placing the last upon a jack 19 and is presented bottom upwardly to the feeding rest 13, its edge resting on the edge rest 14; to this end the jack 19 has its bottom end in ball-and-socket connection with the head end of rod 21, and permits universally free rotative and rocking movements. Rod 21 has its bottom end in connection with treadle 22, and between a collar 23, on rod 21, and a bracket 24 on column 2, is a spiral spring 25, which spring 25 is under tension normally, for suitably lifting the jack and holding it upwardly in position for holding the shoe against the rest members 13 and 14, in position for the upper to be gripped by the pincers members 26, 27. The treadle may be operated for depressing the jack into position for taking off and putting on the shoe. It will be observed that the position in which the shoe is supported with relation to the pincers and other devices which operate upon the shoe is determined in the present machine by positioning means including the feeding rest 13, the edge rest 14, and the yieldingly supported jack 19. It is not essential, however, to the invention that these devices coöperate with one another for positioning the shoe, as one or more of them may be omitted if desired.

The pincers comprise jaws 26, 27; jaw 27 is on the bar 28, which bar is grooved for receiving the slide 29, Fig. 14. The other pincer jaw 26 is pivoted upon bar 28 and is connected at its rear or heel end with slide 29, whereby, as the slide 29 is moved longitudinally in one direction, the pincer jaw 26 is rocked toward the jaw 27 for gripping the upper, and by a reverse movement of the slide 29 said jaw 26 is lifted for releasing the upper. The bar 28 in this manner is made to support the pincers for other than the gripping movement. To this end the bar 28 is mounted on the carriage 30, which carriage is supported to slide on ways 31 suitably formed therefor in the head 3, which permit movement of the carriage forwardly to carry the pincers to the point for gripping the upper, and then backward for moving the pincers into position for placing the upper over the inner-sole. The post or pintle 32 has support in the carriage 30, to be engaged laterally by the face n on cam 33, whereby as the cam revolves motion is transmitted to move the carriage 30 forwardly. This movement carries the pincers into the foremost or gripping positions. Movement of the carriage backwardly is effected by the spring 34, which movement it will be understood operates for straining the upper and carrying it over the innersole. To this end the spring 34 is supported on the stud 35, in bearing at one end with the lever 36, which lever has connection with stud 37, on carriage 30, and gives motion from the spring to the carriage whenever cam 33 permits it. Connected with the spring 34 is a ratchet 38 and a pawl contrivance, whereby tension of the spring may be varied conformably to the requirements of different materials.

The pintle 32 is pressed normally upward by a spring X, its top end being thus held in bearing with the face $m$ on cam 33. Said pintle carries the rack $X^1$, in mesh with gear teeth cut in end of lever $X^2$, which lever is pivoted upon the carriage 30 and is connected at its lower end with the arm $X^3$ on pincers slide 29 of the pincers. From this description it will be understood that downward movement imparted by the cam face $m$ to the pintle 32 operates through the rack $X^1$, lever $X^2$, and arm $X^3$, for moving slide 29 to rock the jaw 26, for closing the pincers to grip the upper. This movement is caused to take place against the tension of spring X, and holds the upper during the straining and overlaying process responding to the contour of cam face $m$. Said spring X operates when permitted by cam face $m$ to lift the pintle 32, and thereby open the jaw member 26 for releasing the upper. Beside the opening and closing movements of the pincers jaws, and movements of the pincers forwardly and backwardly, provision is made for additional movements of the pincers vertically to strain the upper, and twisting movements of the pincers for use in crimping or plaiting the upper at times. To this end the pincers are supported in the carriage 30 by an intermediate member 39, which member is itself pivoted in the carriage 30 to permit tilting movements vertically on the studs 40. The member 39 has an opening therethrough wherein bar 28 of the pincers is journaled for rocking movements rotatively. The member 39 comprises a vertical arm $39^a$ which extends upwardly into position to be engaged by the side face $e$ of the cam 33, whereby motion is transmitted for tilting the member 39 about the pivot studs 40 and thereby moving the pincers downwardly. This tilting movement, it will be understood, is made to take place while the pincers are being moved forwardly toward the gripping point, and lowers the pincers jaws into position to take hold of the upper. It is to be observed that the relative arrangement of the pivot-studs 40 to the last bottom and pincers jaws is such that the pincers jaws, when in the gripping position, are at a point below the horizontal plane of the pins 40, and consequently, as the reverse or lifting movement of the member 39 takes place, it causes the pincers jaws to move in a curved line running outwardly and upwardly from the edge of the last. This, it will be understood, causes the upper to be strained outwardly and upwardly from the edge of the last, preliminary to the operation for placing it over the inner-sole. This, it is believed, is a new feature in lasting machines, and it is one important feature of this invention. The reverse tilting movement of the member 39 for lifting the pincers is effected by a spring 42, which to that end is mounted on a rod 43 which is supported in the carriage 30 to permit endwise movement and has a pin and slot connection with the member 39, as shown in Fig. 10, to permit the required freedom of movement. The spring 42 is normally under tension between the carriage 30 and a nut $X^5$ on the end of the rod 43 and is further compressed by the movement of said rod caused by the tilting of the member 39 for lowering the pincers. When the cam face $e$ permits it to do so, the said spring reversely tilts the member 39 for lifting the pincers and thereby straining the upper. Tension of the spring 42 may be varied, by a suitable operation of the nut $X^5$, to suit the requirements of different materials.

On the machine column is a boss 112, whereon is pivotally supported the lever 113, which lever has on its outer free end a fork to receive the knee of the workman. Lever 113 carries on its rear end a segmental rack 114, in mesh with a gear 115 on the vertical shaft 116, wherethrough swinging of the lever 113 horizontally operates for turning the shaft 116. Shaft 116 carries a gear 121 in mesh with toothed formations 120 on a connecting rod $118^x$, which is supported in the head 3 for endwise movement.

The machine shaft 4 comprises a square section whereon is a hub 123 (Fig. 8) arranged for movement rotatively with the shaft and for independent movement longitudinally on the shaft 4. Said movement longitudinally is effected from the connecting rod $118^x$, through an intermediate part 124, comprising a ring and a radially extended shank wherein the hub is permitted to revolve. A lever 125 has one end connected with the shaft 4, whereby the lever is made to revolve with the shaft 4. Said lever has an inclined groove 126 adapted for receiving the pin 127 of hub 123. The opposite end of said lever carries a block 128, arranged to permit sliding movement on the block X9X, which it will be understood is integral with shaft 4, whereby the block 128 may be shifted from axial alinement with the shaft 4, toward opposite sides thereof. On the pincers bar 28 is an arm 129, having ball-and-socket connections with link 130, which link has pivotal connection with the arm 131 of a rock-shaft 132. On shaft 132 is an arm 133, having pivotal connection with part 134, which part comprises a strap or ring wherein the block 128 is journaled for movement rotatively. Obviously, a movement of the block 128, whereby it is carried out of alinement with the axis of rotation of shaft 4, to one side thereof, will cause it to act as a crank for rocking the pincers rotatively to one side, and movement of the block 128, in the opposite direction, whereby it is carried out of alinement with the axis of rotation of shaft 4, to the other side thereof, will rock the pincers in a similar manner to the other side. A movement of the block 128, whereby it is positioned in alinement with the axis of rotation of shaft 4, will allow the block 128 to turn in the part 134, without imparting motion thereto, and the rocking movements of the pincers will consequently be discontinued. This it will be understood, is the position of the block 128 while the lever 113 rests in the straightforward position, that is, midway of its line of horizontal movement. It is this position from which as a starting point the lever 113 is moved horizontally to one side for moving the hub 123 to actuate the lever 125, for placing the block 128 on one side of the axis of rotation of shaft 4, and thereby causing the pincers to start rotative movement in one direction. A movement of the lever 113 in like manner to the opposite side of the straightforward or central position, operates the parts for placing the block 128 in position to the other side of the axis of rotation of shaft 4, and starts the rocking movements of the pincers in the opposite direction. Said lateral movements of the lever 113 are allowed by the workman at will. The parts coöperating to move the pincers are preferably so arranged relatively that turning of the pincers is caused to take place after the uplifting movement is wholly or sufficiently completed for bringing the axis of rotative movement of the pincers approximately parallel with the plane of the shoe bottom, and turning of the pincers is preferably caused to take place simultaneously with movement of the pincers over the last bottom, whereby the upper is strained and placed over the inner-sole in a direction of a spiral line having its axis approximately parallel with the plane of the shoe innersole. This arrangement operates to place the pincers with the gripping plane of the pincers jaws approximately parallel with the plane of the inner-sole, in which position the twisting movement begins and coöperates with the overlaying movement of the pincers for twisting and straining the upper upwardly and inwardly from the inner-sole, and by taking up the slack prevents formation of a pucker at the edge of the last. This is considered to be a new feature in lasting machines, and comprises an important part of this invention. The described relative arrangement of pincers operating parts will, it is believed, give the best results, but the invention should not be understood as limited to any specific arrangement of such parts. Any arrangement of parts by which the upper is carried over the innersole and is strained in the direction of a spiral line, or by which pincers while gripping the upper are turned on an axis extending in the general direction of the overdrawing movement or approximately parallel with the plane of the inner-sole, obviously falls within the spirit of this invention.

In the machine represented, provision is also made for slitting the edge of the upper at times during the lasting process. To this end cutters 80, 81, are mounted on the bars 82, 83, which bars are supported in the head 3 to permit endwise movement, and comprise toothed formations in mesh with toothed formations on the levers 84, 85. Between the levers 84, 85 is a bifurcated lever 86, having connection with the endwise movable rod 89, whereby to be shifted laterally for engagement at one time, by one arm, with the lever 85 and at another time by the other arm with lever 84. Spring 87 holds the lever 86 upwardly against cam 88 on shaft 4. The lever 86 is moved downwardly by said cam, against the tension of spring 87, for driving the cutter bars forwardly in the operation of slitting the upper. Rod 116 has gear connection through parts 90, 96, 97 see Figs. 1 and 9 with toothed formations on rod 89, whereby the movement of the rod 89 is effected, from the knee lever 113, to place the lever 86 in position relatively to the arms 84, 85, and cause the cutters to move in cutting the upper. The relative arrangement of these parts is such that a movement of the knee lever 113 to one side of its middle position, as before described, for causing movement of the pincers rotatively in one direction, puts into operation the cutter set for cutting the material on one side of the pincers. A counter movement of the knee lever 113 to the opposite side of its middle position will put in operation the cutter set for slitting the upper on the other side of the pincers. With the knee lever in the middle position, lever 86 will move between the levers 84, 85, and there will be no movement of the cutters. Obviously, with this arrangement the slitting operations are made to take place conformably with the twisting movements of the pincers, and are timed for slitting the upper preliminary for the plaiting thereof. It may be required at times to turn the pincers rotatively when slitting of the upper is not desirable; to this end the cam 88 is splined and keyed for sliding movement on shaft 4, and is connected with an arm 91 of a sliding bar, which may be operated by handle 92 for moving the cam 88 longitudinally of the shaft 4 out of position to engage the lever 86. As I am advised of the state of the art it is new with me to provide a machine for working an upper over a last with means for slitting the upper in combination with means for turning the pincers about an axis approximately parallel with the bottom of the shoe for crimping or plaiting the upper, and I consider this an important feature of this invention. In the upper-slitting mechanism of the present machine the relative arrangement of the cutter mechanism is such that the cutter members, when slitting the upper, are caused to move through the upper in a line approximately at right angles to the line of the pincers strain thereupon, which extends from the edge of the last to the pincers in a direction nearly perpendicular to the cutter members, as is apparent in Fig. 1, and herein lies a feature of this present invention.

A single pair of pincers is employed, and the lasting operation as a whole is performed step by step, different parts of the upper being presented to the action of the pincers at different times. In this connection, mechanism is provided whereby, if desired, the shoe may be automatically moved about. To this end the feeding rest 13 is moved rotatably as follows: The lever 54 see Fig. 13 engages by one end with cam 55, on shaft 4 and connects by the other end with the arm 50, which is mounted to turn loosely on the feeding rest. The bifurcated pawl 51 is pivoted on the arm 50, and permits movement rotatively for engaging the arm 52 with the toothed formations on said feeding rest in order to effect motion thereof in one direction. Motion of the rest in a reverse direction may be effected by engaging the pawl arm 53 with said toothed formations on the feeding rest. The pawl may be set in a central position out of engagement with the feeding rest whenever no feeding of the shoe automatically is desired. For holding the pawl in any one of its adjusted positions it is provided with a spring-pressed plunger adapted to engage a notched surface on the arm 50, as shown in Fig. 15.

In lasting machines of the class represented, it is common for the workman, while lasting the heel parts of the upper to depress the last away from the pincers, during the closing together of the pincers jaws, whereby gripping of the upper is avoided, and to return it upwardly to the bottom rest and edge rest in position for receiving action of the other lasting members, all this to the end that the upper may be laid over upon the innersole and secured thereto without being subjected to the action of the pincers. In accordance with a feature of this invention the machine is provided with means for causing the shoe and the pincers to be relatively positioned during the closing of the means for so actuating one of the devices by the pincers. While this may be accomplished in many ways, I have herein shown means for actuating one of the devices by which the shoe is positioned that the shoe is carried out of position for the upper to be gripped by the pincers when they close. This means as herein shown comprises a connection between the yieldingly supported jack and a moving part of the machine whereby the jack is depressed to position the shoe below the plane of the pincers when the pincers are closing and is permitted to rise for positioning the shoe in operative relation to the devices for forcing the upper over the inner-sole and securing it in lasted position. In the present machine provision is made for causing said depressing movements of the shoe to take place automatically. To this end the rod 100 is arranged for support and endwise movement in hanger 101, and connects pivotally, by pin OX, see Fig. 26 with fulcrum block 102, which block is mounted to slide loosely on lever 103. Lever 103 connects pivotally with the top end or rod 104, the bottom end of which rod connects with the treadle 22. Lever 103 has pivotal connection by its other end with the bottom end of rod 105, which rod 105 extends upwardly to a cam 106 on shaft 4, against which cam it is yieldingly pressed by spring 107. It will be observed that during each revolution of shaft 4 the cam 106 is moved to effect a downward movement of the rod 105, which movement being transmitted to the lever 103 will pass on to the rod 104 to an extent determined by the position on said lever of the fulcrum block 102. When the fulcrum block occupies the full-line position shown in Fig. 2 the movement transmitted is very slight and is taken up by the lost-motion connection between the rod and the treadle shown clearly in Fig. 2, so that the treadle and the jack connected to it may remain at rest while parts of the shoe other than the heel are being lasted.

Suppose now that the workman is about to begin the operations for lasting the heel of the shoe, where gripping of the upper is not desired; he will operate the hand lever 108 to move the shaft 100, and thereby arrange the fulcrum block 102 into a position on lever 103, as, for example, that shown in dotted lines in Fig. 2, at such distance from rod 104 as will cause the motion of the lever 103 to be imparted to rod 104, and thence through the treadle 22 and rod 21 for depressing the jack, and consequently the shoe supported thereby during the time of closing together of the pincers as before stated. Obviously, a counter movement of the hand lever 108 will position the fulcrum block 102 in close proximity to the rod 104 when downward movement of the shoe is not desired, as when lasting operations are being carried on about the fore parts of the shoe. As I am advised, it is new with me to provide means adapted normally to position the shoe for receiving the gripping action of the pincers and means for automatically shifting said positioning means, and thereby the shoe, during a number of repeated operations of the machine whereby gripping of the upper is avoided while the pincers continue to be actuated; and this means for moving the shoe to prevent gripping of the upper by the pincers constitutes another feature of this invention. The hand lever 108 has connection with the rod 109, whereon is supported the cam 118, to the end that it may be moved for turning the cam 118 as required for shifting the edge rest 14 to the different altitudes above referred to, and in the present instance, the relative arrangement of the parts is such that one and the same movement of the lever 108 will operate to put into action the mechanism for intermittently depressing the shoe, and simultaneously operate the parts wherethrough the edge rest is shifted from the altitude for resting on the fore part to the altitude required for resting on the heel part. In the latter position the edge rest presents to the shoe a bearing wider or of greater vertical extent than the range of the vertical movements of the shoe, so that operative contact of the shoe with the rest may be maintained when the shoe is depressed.

The machine comprises also a presser 200, adapted to be moved forwardly and backwardly over the bottom of the inner-sole for wiping the upper material over the edge of the last. As shown, the presser 200 connects rearwardly with a swinging part 205, which in turn is pivotally connected with the rod 109, whereby turning of the rod 109 operates to put the part 205 into and out of alinement with the rod 206. The swinging lever 207 connects at one end with rod 206, and is held by the spring 208, in bearing with cam 202, on shaft 4. Motion is imparted by cam 202 for moving the presser forwardly, and it is moved rearwardly, when the cam permits it, by spring 204. In the present instance connection is made between the part 205, and handled rod 109, whereby a movement of the handle 108, for starting and suspending the operations of the mechanism for depressing the jack and shifting the altitude of the edge rest 14, will simultaneously shift the position of the part 205, for starting and suspending operations of the presser.

Besides the mechanism already described this machine further comprises a pounder 70, the function whereof is to pound the wrinkled or raised parts of the material. To that end it is supported in the head 3, for movement from and towards the last. Its top end being directly under the spring-actuated arm 71, it is lifted by a cam 72, on shaft 4, against the tension of spring 73, which acts whenever the cam permits it, for driving the pounder towards the material. In the present instance the pounder is made to operate once only during each revolution of shaft 4, but it may, obviously, be caused to move a plurality of times during each revolution of shaft 4, by suitably varying the contour of cam 72, as shown in Fig. 23ª, for example. The pounder is preferably arranged to move in a path inclined to the plane of the shoe bottom that it may strike an oblique blow inclined downwardly toward the shoe bottom and inwardly away from the edge of the shoe, whereby the pulled upper is drawn more tightly over the last. The acting face of the pounder is shown as inclined to its path of movement, its lowest portion being formed on the side most remote from the edge of the shoe so that any extra thickness of upper material caused, for example, by plaits and located back from the edge of the shoe will be pounded hard and at the same time be forced inwardly. The pounder is also preferably arranged and has its acting face of proper size to engage the upper materials on the shoe bottom from the edge of the shoe inwardly beyond the point where the securing tacks are usually inserted, whereby the shoe bottom is prepared for the fitting of the sole thereto and has its edge smoothed and shaped, all as will be understood by reference to the drawings, particularly Figs. 19 to 22.

After a section of the upper material is suitably strained and laid over upon the inner-sole, it must be fastened in place. This is commonly done by inserting some suitable fastening device through the overturned upper into the inner-sole. In the present instance, the pounder 70 is employed for supporting the fastening device in position at the driving point. To this end it has a channel 63 extending therethrough, and a side opening 74, wherethrough the fastening device is introduced from a suitable supplying mechanism into the channel 63. Said channel 63 opens through the bottom face of the pounder, and therethrough the fastening device is discharged by a hammer 76 into the upper and inner-sole. Said hammer is arranged with the top end of its carrying bar under the spring-actuated arm 77. It is lifted vertically by the cam 78, on shaft 4, against the tension of spring 79, which spring, when permitted by the cam 78, operates the hammer downwardly for inserting the fastener stationed therebelow.

It remains to describe the fastener supplying mechanism. To this end the present machine comprises a shaft 56, having at one end a tubular portion through which the metallic ribbon or tape of I form is fed from a reel 59 mounted in shaft 56. Shaft 56 has at the other end a gear 57 in mesh with gear 58 on shaft 4. It carries a cam 69 for engaging the cutter levers 60, 61, whereby at each half revolution of the shaft the cutters are forced to close upon and sever a portion from the end of the metallic ribbon. The cutting is made on a line oblique to the axis of the ribbon whereby to give a point to the severed part which constitutes the fastening device and passes directly forward through the opening 74 into the pounder channel 63, and to this end the cutter members have their faces beveled for better guiding the severed fastening to the opening 74. The feed rolls 64, 65, and ratchet 66, are carried by the shaft 56, and are on the shaft in position for the ratchet to engage with stops 68, on head 3, one of said stops being shown in Fig. 17 and in passing round with the shaft 56 said ratchet wheel engages the stops and is actuated thereby to turn, the feed rolls, a step forwardly at each half revolution of the shaft 56 to feed the ribbon a distance suitable for the next succeeding operation of the cutter members,—see Figs. 19, 20, 21, 22.

It will be understood that, instead of the mechanism described, a mechanism for supplying loose tacks or other suitable fastening medium may be employed.

In using the machine the jack is depressed by the foot lever 22 and the shoe to be lasted is applied thereto in usual manner, the jack being then pressed upwardly by the spring 25 to present the shoe against the feeding rest 13. The workman holds the side of the shoe against the edge rest 14 and after observing that the edge of the upper is located between the open jaws of the pincers, which at this time should be in their lowest position, starts the machine by operating the treadle 9 connected with the clutch. The pincers are first closed by the downward movement of the pintle 32, effected by the cam face $m$, which turns the lever $X^2$ and moves the slide 29 to swing the pincers member 26 toward the member 27. The face $e$ of the cam in engagement with the arm $39^a$ of the member 39 has held the pincers tilted downwardly during the closing of the pincers, but as soon as the upper has been gripped the face $e$ moves away from the arm $39^a$ and permits the spring 42 to actuate said member 39 for yieldingly tilting the pincers upwardly about the studs 40 into a plane approximately parallel with the face of the innersole, whereby the upper is carried upwardly and outwardly away from the edge of the last and is strained vertically between the last and the pincers. The pincers are now moved in the direction for carrying the pulled upper over the innersole, this movement being effected yieldingly by the spring 34, which moves the carriage 30 in its guideways 31 in the frame, as indicated in Fig. 12. The cam face $e$ is preferably shaped to tilt the pincers downwardly during their movement over the shoe so that the combined movement will lay the upper down on the innersole in position to be secured to it.

If the upper requires to be crimped or plaited, as it does at the toe, and it may be at other parts, to dispose of the fullness of upper material, the mechanism for turning the pincers will have been rendered operative by actuating the knee lever 113 toward the right or the left of its central position according as the lasting operation is to proceed in the one or the other direction. This movement of the knee lever turns the shaft 116 and slides the rod $118^x$ forwardly or backwardly and this rod moves the part 124, the slide 125, and the block 128 for causing the rockshaft 132 to be turned and the rod 130 and arm 129 to be actuated for rotating the pincers in their bearings in the member 39. The block X9X is so positioned on the shaft with relation to the cam block 33 that the pincers are turned after they have reached, in their tilting movement above described, a plane approximately parallel with the plane of the innersole and before the upper is laid down on the innersole. By this arrangement the upper is strained and carried over the innersole in the direction of a spiral line having its axis approximately parallel with the plane of the innersole, whereby it is crimped or plaited to lie smoothly upon the innersole.

If the slitting mechanism is to be employed it also will be rendered operative by the same movement of the knee lever which renders operative the mechanism for turning the pincers. It is desirable to slit the upper on the side of the pincers toward which they are turned in crimping or plaiting the upper, and the arrangement is such that one knife or the other will be automatically rendered operative according to the direction in which the knee lever is moved, movement in one direction causing the segment 97 to slide rod 89 for shifting the forked lever 86 into position to operate one knife and reverse movement of the knee lever causing the other knife to be operated. The cam 88, by which the cutters are actuated, is preferably positioned on the shaft 4 so that a cutter will be actuated to slit the upper before the turning movement of the pincers is begun, the slit being formed in the upper adjacent to the pincers and extending from near the edge of the shoe to the free edge of the upper. The turning of the pincers is then made to take place about an axis approximately parallel to the slit and it will tend to fold the slitted edge adjacent to the pincers inwardly under the portion held by the pincers. Normally the slitting mechanism will be employed when the mechanism for turning the pincers is operated and the slitting mechanism will be inoperative when the pincers turning mechanism is inoperative; but if it is desired to turn the pincers for crimping or plaiting the upper without slitting it, the cam 88 may be shifted on the shaft 4 by means of the handle 92 into a position where it will not engage the forked lever 86 and then the cutters will not be actuated in any adjustment of the knee lever.

When the upper has been manipulated into position to be secured the cam 72 releases the pounding device 70 and permits it to descend for hammering the upper adjacent to the place where the fastening is to be inserted. The operation of the pounding device preferably, although not necessarily, takes place before the tack is driven and, besides smoothing and shaping the overworked upper on the shoe bottom and preparing it for the fitting of the sole to the shoe, the blow of the pounding device compacts the stock so that a small fastening device when driven will hold the upper securely. As herein shown the driver descends immediately after the pounding device and forces the fastening into the upper and innersole, after which the several parts resume their first positions for repeating the operation on another portion of the upper. During the return of the pincers to position for gripping the upper again the feeding rest is actuated for advancing the shoe, this being effected by the cam 55 acting through the rocking lever 54, as shown in Fig. 13, to swing the pawl 51 and turn the rest. The direction in which the feeding rest is moved is controlled by the adjustment of the pawl 51, and if for any reason automatic feeding of the work is not desired the pawl will be adjusted into its central neutral position in which it will not engage the pinion on the feeding rest shaft.

When the heel or any other portion of the shoe is to be lasted for which it is undesirable to have the pincers grip the upper the hand lever 108 is actuated to shift the fulcrum block 102 for rendering operative the mechanism for depressing the jack to carry the shoe out of the range of action of the pincers, whereby gripping of the upper is avoided. The shaft 109 will preferably be connected to the hand lever 108 to be turned thereby for shifting the edge rest from the position occupied by it when the forepart is being lasted, see Fig. 4, to the position shown in Fig. 3 wherein it presents a longer bearing to the shoe. The movement of the shaft 109 for shifting the edge rest and rendering operative the jack depressing mechanism will also preferably throw into operation the work-presser 200 by putting the block 205 into alinement with the rod 206 which is continuously actuated through the cam 202. When the block 205 is in position to be engaged by the rod 206 the presser will be advanced for forcing the upper materials over the edge of the innersole immediately before the pounder and the driver are actuated for compacting said upper materials and securing them in position.

It will be understood from the foregoing description of the construction and operation of the machine that for lasting the portions of the shoe, such as the sides, which do not require to be crimped and slitted the pincers have a closing, uplifting, and an overdrawing movement while the shoe is held continuously against the feeding rest and has a narrow bearing on the edge rest, the presser being inoperative. For lasting the toe of the shoe the knee lever is shifted to cause turning movements to be imparted to the pincers in addition to their other movements and usually for causing the slitting mechanism to be operated. For lasting the heel of the shoe the turning of the pincers and the movements of the slitting knives are discontinued, the jack depressing mechanism and the presser actuating mechanism are rendered operative, and the edge rest is shifted to present a broad bearing for the shoe.

The mechanism herein shown and described for forming and driving fastenings is not claimed in this application as it forms the subject-matter of a divisional application Serial No. 359,017 filed February 23, 1907.

Having fully described a machine embodying my invention in the best form known to me and having explained the operation of the machine, I claim as new and desire to secure by Letters Patent of the United States:—

1. A lasting machine comprising devices for gripping the upper and devices for resting the shoe, combined with mechanism for shifting the relative positions of said devices for straining the upper in a curved line extending outwardly and upwardly from the edge of the last, substantially as described.

2. In a lasting machine, devices for gripping the upper and means for resting the shoe, combined with mechanism for shifting the relative positions of said devices for straining the upper in a curved line or path extending outwardly and upwardly from the edge of the last and then continuing over the inner-sole, substantially as described.

3. In a lasting machine, devices for gripping the upper, and means for resting the shoe, combined with mechanism for shifting the relative positions of said devices and said means, and means for relatively turning said devices and said means, whereby the upper is strained and carried over the inner-sole in the direction of a spiral line having its axis approximately parallel to the bottom of the inner-sole, substantially as described.

4. In a lasting machine, means for gripping the upper and means for resting the shoe, combined with mechanism for shifting the relative positions of said two means and means for relatively turning the gripping means and the shoe to strain the upper and carry it over the innersole in the direction of a spiral line.

5. In a lasting machine, pincers for gripping the upper, and means for resting the shoe, combined with mechanism for shifting the relative positions of said pincers and said means, and means for simultaneously turning said pincers, whereby the upper is strained and carried over the inner-sole in the direction of a spiral line having its axis approximately parallel with the plane of the inner-sole, substantially as described.

6. A lasting machine comprising pincers for gripping the upper, combined with mechanism for automatically moving said pincers in a line curving outwardly and upwardly from the edge of the last, substantially as described.

7. In a machine for working an upper over a last, the combination with pincers, of actuating mechanism for automatically closing the pincers and moving them to pull the upper upwardly from the edge of the last, said machine being constructed and arranged for actuating the pincers outwardly with relation to the edge of the last as they move upwardly.

8. A lasting machine having pincers adapted for gripping the upper, combined with actuating mechanism for automatically closing the pincers and moving the pincers to carry the upper outwardly and upwardly from the edge of the last and then over the inner-sole, substantially as described.

9. A lasting machine comprising, in combination, a carriage and means for moving it forwardly and backwardly, devices for gripping the upper mounted in said carriage, and means for moving said devices, said parts being combined and arranged to strain the upper outwardly and upwardly from the edge of the last and then lay it over the inner-sole, substantially as described.

10. In a lasting machine, pincers for gripping the upper, and means for resting the shoe, combined with means for shifting the relative positions of the pincers and said resting means, and means for turning the pincers on an axis approximately parallel to the bottom of the innersole.

11. In a lasting machine, the combination of pincers for gripping the upper, and means for turning the pincers and moving them over the bottom of the last, said pincers being adapted for turning on an axis of motion approximately parallel to the plane of the last bottom, substantially as described, whereby the upper is carried over the inner-sole in the direction of a spiral line having its axis approximately parallel to the plane of the last bottom.

12. In a machine for working an upper over a last, pincers for gripping the upper, a cutting device, means for actuating the cutting device to slit the upper, and means for turning the pincers about an axis approximately parallel with the bottom of the last for crimping or plaiting the upper.

13. In a machine of the class described, pincers for gripping and pulling an upper, a cutter, means for relatively actuating the pincers and cutter to slit the upper, and means for turning the pincers about an axis extending approximately parallel with the direction of the pulling strain to crimp or plait the upper.

14. In a lasting machine, the combination with pincers for gripping an upper, means for actuating the pincers to stretch the upper gripped thereby, a cutting device for slitting the upper, means for moving the cutting device, when slitting the upper, approximately at right angles to the direction in which the upper is being strained, and means for turning the pincers to crimp or plait the upper.

15. A machine for working an upper over a last, comprising pincers, means to actuate the pincers to pull the upper, a cutting device, means to actuate the cutting device to slit the upper, and mechanism for relatively moving the pincers and the last and for turning the pincers about an axis approximately parallel with the bottom of the last whereby the portion of upper gripped by the pincers is carried over the innersole in the direction of a spiral line.

16. In a machine for working an upper over a last, pincers and means for relatively moving the pincers and last vertically in a predetermined path, combined with a cutter located on either side of the said path, an actuator for the cutters, means for shifting the actuator into operative relation to either cutter, a cam for rocking the actuator and means for adjusting the cam from and toward position to engage the actuator.

17. In a machine for working an upper over a last, the combination with pincers for gripping and pulling the upper, and means for cutting the upper adjacent to the pincers, of mechanism for actuating the pincers to lay the gripped and pulled upper over the last bottom and to fold the cut edge of the upper under the portion held by the pincers.

18. In a machine for working an upper over a last, the combination with pincers for gripping the upper, means for moving the pincers and last relatively for pulling the upper, and means for slitting the upper adjacent to the pincers, of means for relatively actuating the pincers and last to lay the pulled upper over the bottom of the last, and means for turning the pincers in a direction to fold the cut edge of the upper under the portion held by the pincers.

19. In a machine for working an upper over a last, pincers for gripping the upper, a cutting device, means for actuating the cutting device to slit the upper, and means for turning the pincers about an axis approximately in the plane of the gripped upper.

20. In a machine of the class described, a movable edge rest, and means for positioning said rest to present a narrow bearing to the work while one portion of the shoe is being operated upon and to present a wider bearing to the work when another portion of the shoe is being operated upon.

21. In a machine of the class described, a pivoted edge rest, and means under control of the workman for positioning said rest to present at one time a narrow bearing to the work and at another time a wider bearing to the work.

22. In a machine of the class described, means including a presser for working an upper over a last, a movable edge rest, and means under control of the workman for rendering the work presser operative or inoperative and for simultaneously positioning the edge rest to present a wide or a narrow bearing to the work.

23. A lasting machine, having pincers for gripping the upper, actuating mechanism therefor, means for normally positioning the shoe to receive the gripping action of the pincers, and a movable edge rest, combined with means constructed and arranged to be rendered operative or inoperative at the will of the workman for actuating said positioning means to shift the shoe during repeated operations of the machine, whereby gripping of the upper is avoided while the pincers continue to be actuated, and for positioning the edge rest to present to the work bearings of different widths.

24. A lasting machine having pincers for gripping the upper, and means for supporting the shoe in receiving the gripping action of the pincers, combined with mechanism for automatically shifting the relative positions of the pincers and shoe supporting means, whereby gripping of the upper is avoided at times, while the pincers continue to operate.

25. A lasting machine having pincers for gripping the upper and means for supporting the shoe in position to receive the gripping action of the pincers, combined with means controllable by the workman at will, for automatically shifting the relative positions of the pincers and shoe supporting means, whereby gripping of the upper is avoided, while the pincers continue to operate.

26. A lasting machine having pincers for gripping the upper, and means for resting the shoe in position to receive the gripping action of the pincers, combined with automatic means for repeatedly shifting the relative positions of the pincers and shoe resting means, during a number of repeated operations of the machine, whereby the gripping of the upper is avoided at times while the pincers continue to operate, and means to vary the amount of said shifting movement, substantially as described.

27. A lasting machine having pincers adapted for gripping the upper, and means for resting the shoe in position to receive the gripping action of the pincers, combined with automatic means for repeatedly shifting the relative positions of the pincers and shoe resting means, whereby gripping of the upper is avoided while the pincers continue to operate, and means for starting or suspending the shifting operations at will of the workman, substantially as described.

28. A lasting machine having devices for gripping the upper and means, including a jack, for supporting the shoe in position to receive the gripping action of the pincers, combined with automatic actuating means for repeatedly changing the position of the jack during a number of repeated operations by the machine, whereby the gripping of the upper is avoided at times while the pincers continue to operate, substantially as described.

29. A lasting machine having pincers for gripping the upper, a jack whereon the shoe is supported in position to receive the gripping action of the pincers, a revoluble shaft, and connections between the shaft and jack wherethrough motion is imparted from the shaft for repeatedly moving the jack with relation to the pincers, substantially as described, whereby, in continued operations of the machine gripping of the upper is avoided at times.

30. A lasting machine having pincers for gripping the upper, actuating mechanism therefor, and means for normally positioning the shoe to receive the gripping action of the pincers, combined with means for actuating said positioning means to shift the shoe during a number of repeated operations of the machine whereby gripping of the upper is avoided while the pincers continue to be actuated.

31. A lasting machine having pincers for gripping the upper, actuating mechanism therefor, and means for normally positioning the shoe to receive the gripping action of the pincers, combined with means constructed and arranged to be rendered operative or inoperative at the will of the workman for actuating said positioning means to shift the shoe during a number of repeated operations of the machine whereby gripping of the upper is avoided while the pincers continue to be actuated.

32. In a machine for working an upper over a last, the combination with means for positioning a shoe, of pincers, means for automatically closing the pincers to grip the upper, and means constructed to be rendered operative for causing the shoe and the pincers to be positioned relatively so that the upper will not be gripped by the pincers.

33. In a machine for working an upper over a last, the combination with means for positioning a shoe, of pincers, means for automatically closing the pincers to grip the upper, means for relatively actuating the pincers and shoe positioning means toward and from each other to locate the pincers and shoe relatively for the upper to be gripped when the pincers are closed, and means adapted to be rendered operative for locating the pincers and shoe relatively at the time the pincers are closed so that gripping of the upper will be avoided.

34. In a machine for working an upper over a last, the combination with means for positioning a shoe, of pincers, means for automatically closing the pincers, a cam, and connections between the cam and the shoe positioning means for actuating the latter to move the shoe out of the range of the pincers while they are closing, and means for rendering said connections operative or inoperative.

35. In a machine for working an upper over a last, the combination with means including a jack for positioning a shoe, of pincers, means for automatically closing the pincers, connections between the jack and a moving part of the machine constructed to be rendered operative for causing the jack to be depressed to carry the shoe below the plane of the pincers while the pincers are closing, and means for thereafter raising the jack.

36. A lasting machine having an edge rest, mechanism for shifting it into positions of different altitude, a repeatedly moving work presser, and mechanism for starting or suspending the operations of the work presser at times, combined with means wherethrough the mechanism for shifting the altitude of the edge rest and mechanism for starting or suspending the operations of the work presser are put into action by a single operation, substantially as described.

37. In a machine for working an upper over a last, the combination with a presser constructed and arranged to be rendered operative or inoperative, and an adjustable edge rest, of means under control of the operator for rendering the presser operative or inoperative and simultaneously adjusting the edge rest.

38. A lasting machine, having a jack for holding the shoe and mechanism for shifting it into different positions and a repeatedly moving work presser and mechanism to be operated for starting or suspending the operation of the work presser at times, combined with means wherethrough the mechanism for shifting the position of the jack and the mechanism for starting or suspending the operation of the work presser are put into action, by a single operation, substantially as described.

39. A lasting machine, having an edge rest and mechanism for shifting it into different positions, means for supporting the shoe and mechanism for shifting it into different positions, a repeatedly moving work presser and mechanism for starting or suspending the operations of the present, at times, combined with means wherethrough the mechanism for shifting the position of the edge rest, and the mechanism for shifting the position of the shoe supporting means, and the mechanism for starting or suspending the operation of the work presser, are put into action, by a single operation, substantially as described.

40. In a machine for working an upper over a last, the combination with an edge rest movable to present a narrow or a wide bearing to the shoe, of means for positioning the shoe, means for actuating the positioning means to move the shoe vertically, and means under control of the operator to render said actuating means operative and move the edge rest to present to the shoe a wide bearing.

41. In a machine for working an upper over a last, the combination with means for positioning a shoe vertically, and a movable edge rest, of pincers, means for automatically closing the pincers to grip the upper, and means constructed to be rendered operative for adjusting the edge rest and for causing the pincers and the shoe to be relatively positioned so that the upper will not be gripped by the pincers.

42. In a lasting machine, the combination with means for positioning a shoe, means including pincers and a reciprocating presser for working the upper over the last, and means for automatically closing the pincers to grip the upper, of means under control of the operator for relatively locating the positioning means and the pincers to avoid gripping of the upper, and means arranged to be simultaneously actuated for rendering the presser operative when gripping of the upper is avoided and for rendering the presser inoperative when gripping of the upper takes place.

43. In a lasting machine, the combination with means for working an upper over a last including pincers and a presser, means for automatically closing the pincers to grip the upper, means for actuating the presser, and means for positioning the shoe, of mechanism for actuating said positioning means to locate the shoe so as to allow or avoid gripping of the upper and for rendering the presser operative when gripping of the upper is avoided and inoperative when gripping of the upper is allowed.

44. In a lasting machine, a pincers mechanism, comprising a carriage, a pincers support pivotally mounted on said carriage, pincers extended laterally from said support, and means for rocking the pincers support to lower the pincers into gripping position and raise the pincers for pulling the gripped upper.

45. In a lasting machine, a pincers mechanism, comprising a carriage, a pincers support pivotally connected to the carriage, pincers movably mounted in said support and extended laterally therefrom, means for rocking the support to lower and raise the pincers, and means for turning the pincers in the support to crimp or plait the upper held by them.

46. In a lasting machine, a pincers mechanism, comprising a carriage, a pincers support pivotally mounted on said carriage, pincers extended laterally from said support, means for rocking the pincers support to lower the pincers into gripping position and raise the pincers for pulling the gripped upper, and means for actuating the carriage to lay the pulled upper over the shoe bottom.

47. A lasting machine having in combination means for working an upper over a last, fastener inserting means, and means including a yielding element for pounding the upper adjacent to the place where the fastener is to be inserted.

48. In a machine for working an upper over a last, means for crimping the upper, means including a yielding element for pounding the crimped portions of upper, and means for subsequently securing said portions of upper to an innersole.

49. A machine for lasting shoes, having in combination means for working an upper over a last, a driver for inserting fastenings, and a pounder surrounding the driver, in combination with means to actuate the pounder to compact the overworked portions of upper, and means to actuate the driver to insert fastenings therein.

50. A lasting machine, having in combination means for working an upper over a last, means for securing the upper to the inner-sole, and automatic means including a yielding element for pounding the overworked portions of upper before they are secured to the inner-sole.

51. A lasting machine, having in combination means including a presser for working an upper over a last, means to actuate the presser, means for securing the upper in overworked position, means for pounding the overworked portions of upper and mechanism adapted to actuate the several means in time relation.

52. In a machine of the class described, the combination with means for guiding a shoe, automatically operated means moving obliquely toward the shoe for pounding the stock from the edge of the shoe inwardly to and beyond the tacking line and automatic means operating alternately with said pounding means for inserting tacks in the stock.

53. In a machine of the class described, the combination with a pounder and means for actuating the pounder toward the bottom of the shoe at an oblique angle, of means for inserting a fastening to secure the upper in position, said mechanism including means for imparting a yielding character to the engagement of the pounder with the shoe.

54. In a machine of the class described, the combination with a pounder, of means for positioning a shoe, and means for actuating the pounder upwardly away from the shoe and then toward the shoe in a path inclined downwardly and inwardly with relation to the shoe bottom, the machine having provision for effecting a yielding engagement of the pounder with the shoe.

55. In a machine for working an upper over a last, the combination with a presser for forcing the upper over the bottom of the last, of a pounder for beating the upper on the last bottom and connected mechanism for automatically driving the presser and the pounder.

56. In a machine for working an upper over a last, the combination with a presser for forcing the upper over the bottom of the last, of a pounder and means for alternately actuating said presser and pounder.

57. In a machine for working an upper over a last, the combination with means for slitting the marginal portion of the upper, and means for plaiting the upper, of means for pounding the over-worked upper.

58. In a machine of the class described, the combination with a pounder and means for actuating the pounder to beat the stock, of means for feeding the stock.

59. In a machine of the class described, the combination with means for supporting a shoe, of a pounder, means to actuate the pounder to beat the shoe bottom, and means for automatically feeding the shoe.

60. In a machine of the class described, the combination with means for pounding the bottom of a lasted shoe, means for applying a fastening to the shoe, and means for feeding the shoe, of mechanism for successively actuating said several means.

61. In a machine for working an upper over a last, the combination with pincers for gripping the upper and pulling it over the last, and a presser for pressing the upper over the last, of mechanism for actuating said pincers and presser, and means under the control of the operator to cause gripping of the upper by the pincers to be avoided when the presser is operative.

62. In a machine of the class described, the combination with means for working an upper over a last, of means for positioning the shoe vertically, means arranged to be rendered operative or inoperative for actuating said positioning means to move the shoe up and down, an adjustable edge rest presenting in one position thereof a relatively narrow bearing to the shoe, and means for simultaneously rendering said actuating means operative and adjusting the edge rest to present a bearing of greater vertical extent than the range of movement of the shoe.

63. In a machine constructed and arranged for working an upper over a last and securing it, the combination of means including a driver for inserting fastenings, with means yieldingly actuated separately from the driver and adapted to pound or beat the upper adjacent to the inserting point before the fastener is driven.

64. A machine of the class described, having a pounder and means for actuating the pounder to force the upper simultaneously downwardly toward the shoe bottom and inwardly away from the edge of the shoe, said means including provision for imparting a yielding character to the engagement of the pounder with the shoe bottom, and means for inserting fastenings arranged to be employed while the pounder is in use.

65. A machine of the class described, having in combination a jack for resting a shoe, a pounder, means for yieldingly actuating the pounder simultaneously downwardly and inwardly with relation to the shoe bottom, and means for driving tacks into the pounded upper while the pounder continues in operation.

66. A machine of the class described, having means for supporting a shoe and a pounder relatively arranged to cause the pounder to beat the upper on the shoe bottom downwardly toward the face of the innersole and inwardly away from the edge of the innersole, and automatically operating means for actuating the pounder toward and into yielding engagement with and then away from and out of contact with the upper.

67. In a machine for beating the upper on the bottom of a shoe, the combination with a pounder and means for yieldingly actuating the pounder to deliver oblique blows to the shoe, of positioning means arranged to permit the shoe to be presented at different altitudes with relation to the path of the pounder for varying the effect of the blows on the shoe upper, said machine being constructed and arranged to permit the shoe to be moved to present different portions thereof to the operation of the pounder.

68. In a machine for use in conforming an upper to a last, the combination with means for beating the marginal portion of the upper, and means for inserting tacks; of operating mechanism therefor having provision for actuating one of said means a plurality of times while the other means is actuated a less number of times.

69. In a machine for use in conforming an upper to a last, the combination with means for beating the marginal portion of the upper, and means for inserting tacks; of operating mechanism constructed and arranged to cause the beater to act upon the shoe a plurality of times for each insertion of a tack.

70. In a machine of the class described, the combination with means for working an upper over a last, and means for pounding the upper; of automatically operating mechanism for actuating said two means having provision for actuating one of said means a plurality of times while the other means is actuated a less number of times.

71. In a machine of the class described, the combination with pincers for working an upper over a last, and means for pounding the overworked upper; of operating mechanism for the pincers and the pounder having provision for actuating the pounder a plurality of times while the pincers are actuated once.

72. A lasting machine having pincers for gripping an upper, means for actuating the pincers to pull and lay the upper inwardly over the last bottom, and means for turning the pincers about an axis substantially in the line of the strain on the upper in the overlaying movement.

73. A lasting machine having pincers for gripping an upper, means for actuating the pincers to draw the upper over the last bottom, and means for rotating the pincers about an axis extending in the general direction of the overdraw movement.

74. A lasting machine having pincers for gripping an upper, said pincers being arranged to occupy a position relatively to the shoe with their gripping faces in a plane substantially parallel to the shoe bottom, and means for turning the pincers about an axis in or substantially parallel with their gripping faces.

75. A lasting machine having pincers for gripping an upper, a carrier in which the pincers are rotatable about an axis that is substantially parallel to the shoe bottom, and means for turning the pincers in said carrier.

76. A lasting machine having pincers for gripping an upper, said pincers being arranged to occupy a position relatively to the shoe with their gripping faces in a plane substantially parallel to the shoe bottom, and means operating automatically for moving the pincers angularly about an axis also substantially parallel to the shoe bottom to plait the upper.

In testimony whereof I have signed my name to this specification in the presence of two subscribing witnesses.

WALTER O. WHEELER.

Witnesses:
NELSON W. HOWARD,
EDWARD H. PALMER.

Corrections in Letters Patent No. 910,251.

It is hereby certified that in Letters Patent No. 910,251, granted January 19, 1909, upon the application of Walter O. Wheeler, of Worcester, Massachusetts, for an improvement in "Lasting-Machines," errors appear in the printed specification requiring correction, as follows: Line 72, page 5, should be stricken out and the words *pincers so that the upper is not gripped by* inserted instead; line 75, same page, after the word "for," the word *so* should be inserted; lines 123–124, the word "arrange" should read "*shift;*" lines 118–119, page 10, the words "substantially as described," should be stricken out, and in line 95, page 11, the word "present" should read *presser;* and that the said Letters Patent should be read with these corrections therein that the same may conform to the record of the case in the Patent Office.

Signed and sealed this 9th day of February, A. D. 1909.

[SEAL.]

C. C. BILLINGS,
*Acting Commissioner of Patents.* in or substantially parallel with their gripping faces.

75. A lasting machine having pincers for gripping an upper, a carrier in which the pincers are rotatable about an axis that is substantially parallel to the shoe bottom, and means for turning the pincers in said carrier.

76. A lasting machine having pincers for gripping an upper, said pincers being arranged to occupy a position relatively to the shoe with their gripping faces in a plane substantially parallel to the shoe bottom, and means operating automatically for moving the pincers angularly about an axis also substantially parallel to the shoe bottom to plait the upper.

In testimony whereof I have signed my name to this specification in the presence of two subscribing witnesses.

WALTER O. WHEELER.

Witnesses:
NELSON W. HOWARD,
EDWARD H. PALMER.

---

Corrections in Letters Patent No. 910,251.

It is hereby certified that in Letters Patent No. 910,251, granted January 19, 1909, upon the application of Walter O. Wheeler, of Worcester, Massachusetts, for an improvement in "Lasting-Machines," errors appear in the printed specification requiring correction, as follows: Line 72, page 5, should be stricken out and the words *pincers so that the upper is not gripped by* inserted instead; line 75, same page, after the word "for," the word *so* should be inserted; lines 123–124, the word "arrange" should read "*shift;*" lines 118–119, page 10, the words "substantially as described," should be stricken out, and in line 95, page 11, the word "present" should read *presser;* and that the said Letters Patent should be read with these corrections therein that the same may conform to the record of the case in the Patent Office.

Signed and sealed this 9th day of February, A. D. 1909.

[SEAL.]

C. C. BILLINGS,
*Acting Commissioner of Patents.*

Corrections in Letters Patent No. 910,251.

It is hereby certified that in Letters Patent No. 910,251, granted January 19, 1909, upon the application of Walter O. Wheeler, of Worcester, Massachusetts, for an improvement in "Lasting-Machines," errors appear in the printed specification requiring correction, as follows: Line 72, page 5, should be stricken out and the words *pincers so that the upper is not gripped by* inserted instead; line 75, same page, after the word "for," the word *so* should be inserted; lines 123-124, the word "arrange" should read "*shift;*" lines 118-119, page 10, the words "substantially as described," should be stricken out, and in line 95, page 11, the word "present" should read *presser;* and that the said Letters Patent should be read with these corrections therein that the same may conform to the record of the case in the Patent Office.

Signed and sealed this 9th day of February, A. D. 1909.

[SEAL.]

C. C. BILLINGS,
*Acting Commissioner of Patents.*